United States Patent
Sommer et al.

(10) Patent No.: US 7,374,591 B2
(45) Date of Patent: May 20, 2008

(54) METHOD FOR STARTING A GAS GENERATING SYSTEM

(75) Inventors: Marc Sommer, Ulm (DE); Bernhard Vogel, Stuttgart (DE)

(73) Assignee: Daimler AG, Stuttgart (DE)

( * ) Notice: Subject to any disclaimer, the term of this patent is extended or adjusted under 35 U.S.C. 154(b) by 553 days.

(21) Appl. No.: 10/520,900

(22) PCT Filed: Jul. 2, 2003

(86) PCT No.: PCT/DE03/02199

§ 371 (c)(1),
(2), (4) Date: Jan. 10, 2005

(87) PCT Pub. No.: WO2004/007356

PCT Pub. Date: Jan. 22, 2004

(65) Prior Publication Data

US 2005/0260110 A1    Nov. 24, 2005

(30) Foreign Application Priority Data

Jul. 10, 2002  (DE) ................. 102 31 126

(51) Int. Cl.
  *C01B 3/32* (2006.01)
  *C10J 3/54* (2006.01)
  *B01J 8/00* (2006.01)
  *B01J 19/00* (2006.01)
  *F28D 7/00* (2006.01)
  *H01M 8/18* (2006.01)

(52) U.S. Cl. ............ 48/198.7; 48/197 R; 48/61; 48/127.9; 422/198; 422/199; 429/20; 429/21

(58) Field of Classification Search .......... 422/198, 422/199; 48/61, 198.7; 429/20, 21
See application file for complete search history.

(56) References Cited

U.S. PATENT DOCUMENTS 4,033,133 A    7/1977   Houseman et al. ........... 60/606

(Continued)

FOREIGN PATENT DOCUMENTS

DE    196 39 150    4/1998

(Continued)

OTHER PUBLICATIONS

Patent Abstract of JP 02-017306.*

*Primary Examiner*—Walter D. Griffin
*Assistant Examiner*—Lessanework T Seifu
(74) *Attorney, Agent, or Firm*—Davidson, Davidson & Kappel, LLC

(57) ABSTRACT

A method for starting a gas generating system serving to generate a hydrogenous gas used for operating a fuel cell. The gas generating system includes: devices for converting starting materials into the hydrogenous gas; devices for conditioning at least a portion of the starting materials; devices for purifying the hydrogenous gas by removing unwanted gas constituents, and; a starting burner. According to the method, in a first method step, at least one fuel is combusted inside the starting burner. The hot waste gases resulting from this combustion firstly heat the devices provided for conditioning at least a portion of the starting materials, and the residual heat of these waste gases subsequently heats at least one additional component. In parallel thereto, the devices for converting the starting materials are heated by an electric heating. In a second method step, the starting materials are subsequently fed into the respective components of the aforementioned devices after a starting temperature has been reached. In a third method step, the quantitative proportions of the starting materials are then continuously modified in the direction towards the quantitative proportions provided for the normal operation of the gas generating system.

6 Claims, 3 Drawing Sheets

U.S. PATENT DOCUMENTS

| | | |
|---|---|---|
| 4,820,594 A | 4/1989 | Sugita et al. ................. 429/17 |
| 6,187,066 B1 | 2/2001 | Benz et al. ................ 48/127.9 |
| 6,221,117 B1 * | 4/2001 | Edlund et al. ................. 48/76 |
| 6,231,831 B1 | 5/2001 | Autenrieth et al. ...... 423/648.1 |
| 6,268,075 B1 | 7/2001 | Autenrieth et al. ........... 429/17 |
| 6,294,149 B1 | 9/2001 | Autenrieth et al. ...... 423/648.1 |
| 6,383,468 B1 | 5/2002 | Schuessler et al. ......... 423/651 |
| 2002/0064487 A1 | 5/2002 | Sederquist et al. ......... 422/197 |
| 2002/0150800 A1 * | 10/2002 | Asou et al. ................... 429/20 |

FOREIGN PATENT DOCUMENTS

| | | |
|---|---|---|
| EP | 1 057 780 | 12/2000 |
| JP | 02-017306 * | 1/1990 |
| WO | WO 99/31012 | 6/1999 |
| WO | WO 01/92147 A1 * | 12/2001 |

* cited by examiner

METHOD FOR STARTING A GAS GENERATING SYSTEM

BACKGROUND

The invention relates to a method for starting a gas generation system for generating a hydrogen-containing gas for operating a fuel cell, having devices for converting starting substances into the hydrogen-containing gas, having devices for conditioning at least some of the starting substances, having devices for removing undesirable gas constituents from the hydrogen-containing gas and having a starting burner.

It is known from the general prior art that a hydrogen-containing gas can be generated by conversion of hydrocarbon-containing compounds in what are known as reformers and can be used, for example, to operate a fuel cell. In particular when fuel cells are used in motor vehicles, the hydrogen required can be generated on board from a hydrocarbon-containing compound, such as for example gasoline, diesel, naphtha, natural gas or from an alcohol, such as for example methanol. One particular requirement for all possible applications, but in particular for use in motor vehicles, is for it to be possible for the gas generation system to be started within the shortest possible time. For this purpose, in particular the components which are responsible for reforming the hydrocarbon-containing compound and for removing undesirable gas constituents from the hydrogen-containing gas have to be brought to their normal operating state as quickly as possible.

U.S. Pat. No. 4,820,594 A1 has disclosed a method for starting a gas generation system in a fuel cell system. In the starting phase of the gas generation system, the fuel which is reformed during subsequent operation in the fuel cell system is used to provide the thermal energy required to heat up the gas generation system through direct combustion of this fuel in the region of at least some components of the gas generation system. However, one drawback is that it is very difficult or even impossible to control the temperature of the thermal energy generated by the combustion. In particular when heating components with catalytically active materials, such as for example reformers, selective oxidation stages and the like, at least punctiform overheating may occur, leading to long-term damage to the catalytically active material. Moreover, a further drawback lies in the components having to be designed specially for direct heating, making it more difficult to optimize the components and if appropriate also to thermally insulate them. A further drawback which is certainly also worth noting is that the proposed starting method cannot provide for the heating of further components which require a lower temperature.

Although it would in principle be possible to devise solutions for controlling the temperature, for example by means of substoichiometric or superstoichiometric combustion, such solutions would have the drawback of very high emissions of particulates and/or unburnt residues of the fuel, and in general certainly of a hydrocarbon or the like, or of the provision of large quantities of air.

Other documents, such as for example DE 196 39 150 A1 or U.S. Pat. No. 6,268,075 B1, use catalytic burners to heat the components of the gas generation system. The drawback of such a use of catalytic burners is that only relatively low-boiling fuels can be used. The use of higher-chain and correspondingly higher-boiling hydrocarbon mixtures, such as for example diesel, is not possible or is only possible with considerable outlay for preparing the fuel prior to the actual conversion in the catalytic burners.

SUMMARY OF THE INVENTION

An object of the invention is to provide a method for starting a gas generation system for generating a hydrogen-containing gas for operating a fuel cell, having devices for converting starting substances into the hydrogen-containing gas, having devices for conditioning at least some of the starting substances, having devices for removing undesirable gas constituents from the hydrogen-containing gas and having a starting burner, which avoids drawbacks described in the introduction and which reduces the residues of fuel which are not converted during the start-up process and also any particulates which may form to a minimum.

The present invention provides a method for starting a gas generation system, in which, in a first method step, at least one fuel is burnt in the starting burner, the hot exhaust gases from the combustion firstly heating the devices for conditioning at least some of the starting substances, and the residual heat which still remains thereafter being used to heat at least one further component, the devices for converting the starting substances being heated by electrical heating, after which, in a second method step, the starting substances are added to the respective components of the devices after a starting temperature has been reached, and after which, in a third method step, the quantitative ratio of the starting substances with respect to one another are changed continuously toward an operational quantitative ratio (i.e., the quantitative ratio of the starting substances with respect to one another provided for operation as intended).

This starting method, which relates to a gas generation system in its entirety, uses the energy from direct combustion of a fuel to heat up the devices for conditioning at least some of the starting substances. Since this conditioning of at least some of the starting substances is usually very energy-intensive, on account of the fact that it generally at least also involves the evaporation of water, the high energy content and good efficiency of direct combustion is highly advantageous in this respect. Since the devices for conditioning at least some of the starting substances are usually designed as a heat exchanger and do not generally contain catalytic materials, the risk of damage to the devices through overheating is also relatively low. However, this also means that the combustion can be optimized with a view to minimal emissions rather than having its temperature controlled. The use, according to the invention, of the hot exhaust gases from the combustion to heat the devices for conditioning at least some of the starting substances also creates the option of utilizing the components, i.e. generally the heat exchangers, in the form in which they are already present, since the hot exhaust gases merely have to be passed through part of the heat exchangers through which, in normal operation of the gas generation system, a heat-releasing medium will likewise flow at a later stage. In principle, the fuel used is unimportant. However, according to a highly expedient refinement of the invention, it is possible to use a fuel which is subsequently also used as a starting substance for the generation of the hydrogen-rich gas.

After the heating of the devices for conditioning at least some of the starting substances, the hot exhaust gases from the combustion will be significantly cooled in the starting burner. However, they will still be at a temperature level which is well above the ambient temperature of the gas generation system. Accordingly, the residual heat contained in the exhaust gases can still be used to heat the at least one further component. Depending on the temperature level of the residual heat in the exhaust-gas stream referred to above, the at least one further component may be just one component, which can be operated normally even from a considerably low temperature, or the devices for converting the starting substances into the hydrogen-containing gas or the devices for conditioning the at least some of the starting substances. In this context, the devices for removing undesirable gas constituents from the hydrogen-containing gas, the fuel cell itself or a cooling circuit of the fuel cell can be mentioned as examples of a component of this type, without restricting the invention to these particular examples.

In the devices for converting the starting substances, the starting substances are at least heated by the abovementioned measures in order to be conditioned, and as the starting method continues they are then already approximately ideally conditioned, which generally means evaporated and superheated. The devices for converting the starting substances are therefore already heated to a certain extent by the starting substances themselves. On account of their relatively small heat capacity, they are further heated by electrical heating. This electrical heating, which heats the devices for converting the starting substances even before the starting substances first start to flow in and then heats them further up until transition to normal operation of the gas generation system, can be controlled in a very simple and effective way. For example, the introduction of thermal energy can be controlled in such a manner that ideal heating which is as fast as possible takes place without catalytically active materials which are usually used in the devices for converting the starting substances being subject to thermal damage.

Various devices with in each case different components can be used as devices for converting the starting substances. One example of a solution could, for example, provide for a reformer having at least one downstream shift stage in which the conversion of the starting substances takes place, for example by autothermal reforming or steam reforming.

As has already been mentioned above, after initial heating, in a second method step the starting substances are added to the respective components of the devices as soon as the respective component has reached its starting temperature. In this context, the term starting temperature is to be understood as meaning not the temperature which ensures ideal conversion, but rather the temperature above which conversion is in principle possible, albeit potentially with a poor efficiency and poor utilization of the starting substances.

As is generally customary, this non-optimum conversion during the starting phase is reacted to by employing a corresponding composition of the starting substances in terms of the quantitative ratio. This may mean in particular that relatively little hydrocarbon-containing starting substance is added, in order to keep starting emissions and the formation of particulates at a low level. On the other hand, by suitable measures, for example superstoichiometric combustion in the region of the autothermal reformer, it is possible to achieve an additional heating effect by generating thermal energy during this conversion of the starting substances.

Then, in the method according to the invention, after the method steps described above, these quantitative ratios of the starting substances which have just been discussed are changed continuously with respect to one another in a third method step, in such a manner that they move ever closer to the quantitative ratios provided for operation as intended. The transition from the starting phase to operation as intended therefore takes place continuously or at least quasi-continuously.

Therefore, the method according to the invention can achieve a very fast and effective start, which allows the gas generation system to operate as intended with a minimal starting time and minimal emissions.

According to an advantageous refinement of the gas generation system, the starting substances used are water, an oxygen-containing medium, such as for example air or if appropriate pure oxygen, and a hydrocarbon-containing compound. As has already been mentioned above, in this context it may be advantageous for this hydrocarbon-containing compound also to be used as fuel in the burner. With a further, highly advantageous configuration of this idea, the hydrocarbon-containing compound which is fed to the devices for converting the starting substances during the second method step is evaporated by means of electrical energy at least during part of the time of the second method step.

The starting of the reformer with the oxygen-containing medium, for example air, and/or the water which has evaporated in the devices for conditioning the starting substances, as well as an electrically evaporated liquid fuel, makes it possible to reduce the inevitable residual hydrocarbons in the starting phase of the gas generation system to a minimum. Moreover, the addition of steam ensures that the risk of the reformer, which includes a catalytically active material, overheating is minimized. A further advantage is that the electrical evaporation of the fuel, which generally requires much less energy than the evaporation of the water, which is likewise used, creates the possibility of employing a liquid fuel with a high energy content which is easy to store. Nevertheless, the evaporation produces a very homogenous mixture with the air and/or the steam, which likewise facilitates the conversion, reduces emissions and shortens the starting time of the gas generation system.

As has already been mentioned above, the further component may be a cooling circuit which is heated via a heat exchanger, using the residual heat of the starting burner which remains, after heating of the devices for conditioning at least some of the starting substances. In a system which now includes a selective oxidation stage as a device for removing undesirable gas constituents from the hydrogen-containing gas, this cooling circuit which has just been discussed can also be used to heat this selective oxidation stage. Since the selective oxidation stages require a much lower temperature potential until they are able to start than a reformer or evaporator, the residual heat can be ideally utilized for this purpose, in the manner described above.

Furthermore, according to a highly advantageous refinement of the invention, it is possible for an autothermal reforming stage and at least one shift stage arranged downstream of the latter to be used as devices for converting the starting substances. In a highly expedient refinement of this idea, it is then possible for some of the carbon monoxide and hydrogen coming out of the autothermal reformer to be burnt, with the addition of the oxygen-containing medium, for the further heating of the at least one shift stage during the second method step. This structure as has just been described, with reactive heating of the at least one shift stage through combustion of hydrogen and carbon monoxide, accelerates the heating of the shift stage, in addition to its existing electrical heating, to a considerable extent. This is very important in particular with a view to rapidly connecting up the selective oxidation stage which may be arranged downstream and has already been described above. Since this selective oxidation stage reduces the carbon monoxide in the hydrogen-rich gas, if the selective oxidation stage is activated at a very early stage, it is also possible for the fuel cell itself to be activated at a very early stage, since otherwise it cannot be activated on account of the relatively high carbon monoxide content.

Even with the alternative options of using a hydrogen separation module instead of the selective oxidation stage, as has already been indicated above, this is a crucial advantage, since in this case too a reduction of the carbon monoxide in the hydrogen-rich gas which flows in in the region of the hydrogen separation module significantly improves the operating performance of the latter. This is possible in particular on account of the higher hydrogen partial pressure and the lower CO adsorption in the region of the hydrogen separation module.

One particularly expedient variant configuration of the method according to the invention explained in the introduction may, moreover, provide for the gas which is generated in the devices for converting the starting substances, at least during the initial phase of the second method step, to be passed in a bypass around the devices for removing undesirable gas constituents from the hydrogen-containing gas and/or the fuel cell and fed directly for catalytic combustion, which in turn delivers energy for operating the devices for conditioning at least some of the starting substances.

This procedure is generally very simple in terms of the system connections, since a catalytic burner of this type for burning the residual substances is in any case present for standard operation and is in this case responsible for conditioning at least some of the starting substances. In general, this will involve the evaporation and/or superheating of water and if appropriate also the preheating of the oxygen-containing medium or air. If the product gases which are generated at an early stage in the second method step and at high levels of impurities, in particular carbon monoxide and residual hydrocarbons, are fed direct to the catalytic burner, it is possible to avoid damage to the components for removing undesirable gas constituents from the hydrogen-containing gas and/or the fuel cell itself. The residual substances can be converted approximately ideally into thermal energy in the catalytic burner. This offers the crucial advantage that, on the one hand, it is possible to provide a relatively large quantity of thermal energy, since the otherwise unconverted hydrogen is also burnt here. On the other hand, combustion of the combustible constituents also results in approximately complete conversion thereof, so that at least approximately emission-free operation of the gas generation system is possible.

In a further advantageous configuration of the method according to the invention and/or its refinements, the cooling circuit which has already been referred to above on a number of instances will heat the fuel cell itself as the further component. This relatively gentle heating of the fuel cell by means of the coolant protects the material of the fuel cell, which is relatively sensitive to thermal stresses in particular in the region of the membrane electrode assemblies (MEAs). The coolant which is in any case already in use in the cooling circuit and in the fuel cell during regular operation provides relatively fast yet nevertheless relatively gentle heating of the fuel cell. This too serves to ensure that the entire system composed of gas generation system and fuel cell is ready to operate within a very short time.

If, in a structure of this type, as described above, the product gases are passed into the catalytic burner during the second method step of the starting operation, the catalytic burner delivers some of the energy for the conditioning of at least some of the starting substances. The residual heat of the exhaust gases of the starting burner, which in this case likewise deliver energy, is therefore no longer fully utilized, and consequently a higher thermal energy content is available for heating the further components, and this heating takes place more quickly. Since the residual energy content rises slowly during initial operation of the catalytic burner, the heating of the further components by means of the residual heat is nevertheless comparatively gentle.

BRIEF DESCRIPTION OF THE DRAWINGS

Further advantageous configurations of the invention will emerge from the claims and are explained in more detail on the basis of an exemplary embodiment and with reference to the following figures, in which:

DETAILED DESCRIPTION

Figure 1:
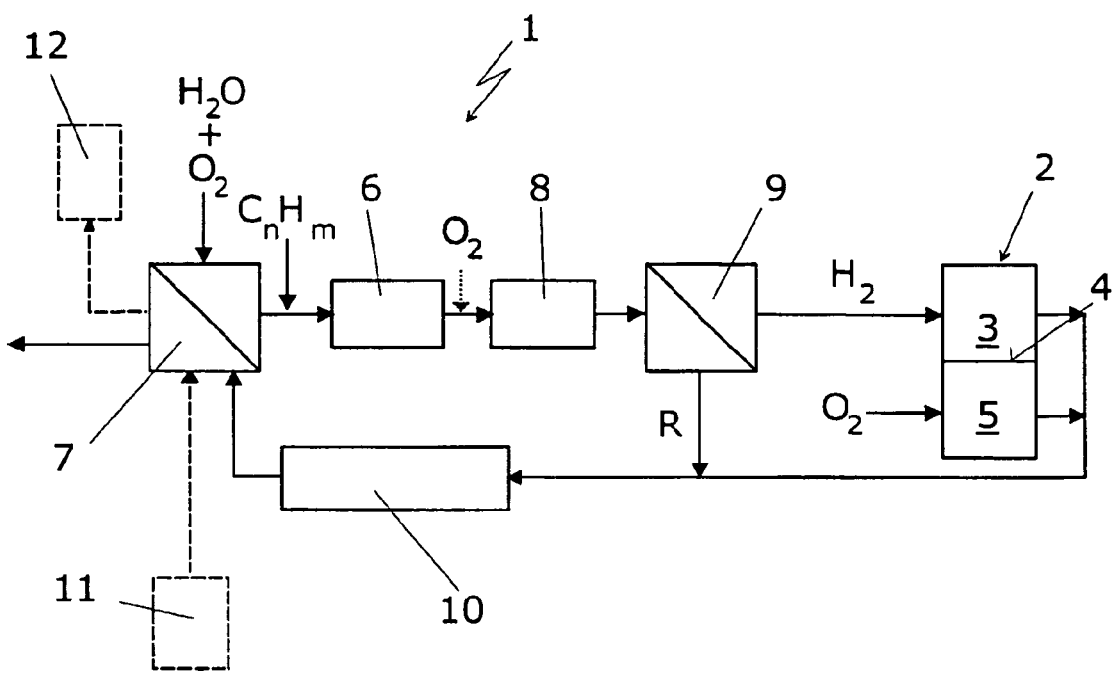
FIG. 1 shows a first possible embodiment of a gas generation system and a fuel cell.

FIG. 1 illustrates a typical gas generation system 1, by means of which a hydrogen-rich gas $H_2$ is generated from a hydrocarbon-containing starting substance $C_nH_m$ together with an oxygen-containing medium $O_2$, such as for example air, and optionally water $H_2O$. This hydrogen-rich gas $H_2$ is fed to a fuel cell 2 which may be designed, for example, as a PEM fuel cell in which an anode space 3 is separated from a cathode space 5 by a proton-conducting membrane (PEM) 4. In the gas generation system 1, the hydrogen-rich gas is generated from the hydrocarbon-containing compound $C_nH_m$, air $O_2$ and water $H_2O$ in a reformer 6, for example by autothermal reforming. For this purpose, the water $H_2O$ which is added is first of all evaporated and/or superheated in a heat exchanger/evaporator 7; the air $O_2$ may be added as early as at this stage, so that it is likewise preheated. Then, the hydrocarbon-containing compound $C_nH_m$, which may, for example, be gasoline or diesel, is supplied upstream of the autothermal reformer 6. A hydrogen-containing gas then leaves the autothermal reformer 6, and its hydrogen content is increased still further in a downstream shift stage 8. This gas, which then represents a hydrogen-rich gas, next flows into a hydrogen separation module 9 or membrane module 9. In the membrane module 9, the hydrogen-rich gas is divided into virtually pure hydrogen $H_2$ and a residual gas, known as the retentate R, by means of membranes, for example based on palladium alloys, which are selectively permeable to hydrogen. The virtually pure hydrogen $H_2$ is fed to the fuel cell, and in this case in particular the anode space 3 of the fuel cell 2. The retentate R passes into a catalytic burner 10.

In the fuel cell 2, the hydrogen $H_2$ and an oxygen-containing medium $O_2$, in particular air, are converted into electrical energy and water. The residual gases or exhaust gases from the region of the fuel cell 2 are likewise fed to the catalytic burner 10 via corresponding lines. The mixture of the exhaust gases from the fuel cell 2 and the retentate R from the membrane module 9 still contains sufficient quantities of oxygen and combustible constituents, such as for example residual hydrogen and residues of hydrocarbons, carbon monoxide and the like which were unable to pass through the membrane module 9. In the catalytic burner 10, thermal energy is generated from the energy content of these residual gases, the exhaust gases from which, in the exemplary embodiment illustrated here, are utilized in particular to heat the heat exchanger/evaporator 7.

The further components, which are illustrated in dashed lines here, are a starting burner 11 and further components 12, which will be dealt with in more detail below, as will the optional addition of air $O_2$ to the shift stage 8, during the description of the method for starting the gas generation system 1.

Figure 2:
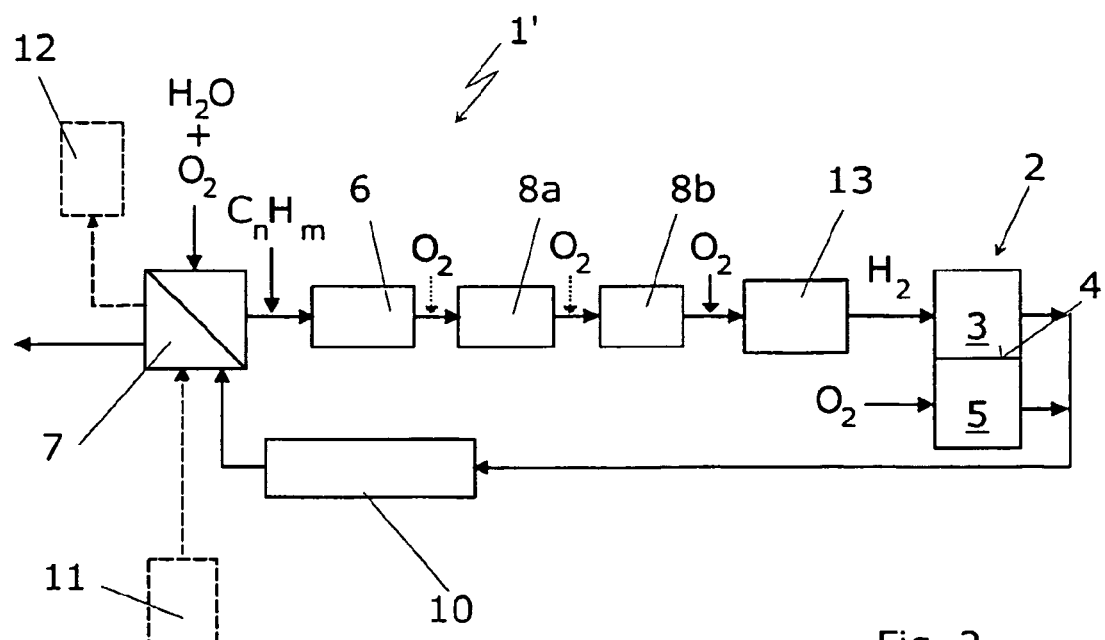
FIG. 2 shows a further possible embodiment of the gas generation system and the fuel cell.

FIG. 2 illustrates a further alternative embodiment of a gas generation system 1'. The gas generation system 1' has similar components to the gas generation system 1 presented above. These components are provided with corresponding reference symbols. Only the differences between the two gas generation systems 1 and 1' will be dealt with in more detail below.

The gas generation system 1' operates in accordance with the same functional principle as the gas generation system 1. Only the removal of undesirable gas constituents from the hydrogen-rich gas, which in the above example was realized via the membrane module 9 as a device for removing undesirable residues, in that case the retentate R, from the hydrogen-rich gas, is designed differently here. After the autothermal reformer 6, the hydrogen-containing gas flows firstly into a high-temperature shift stage 8a and then into a low-temperature shift stage 8b. The functional principle is in this case similar to the one shift stage 8 which is present in the gas generation system 1, in which the level of hydrogen is in each case enriched in a manner known per se. In the gas generation system 1', instead of the membrane module 9 this is followed, to remove undesirable constituents from the gas, by a selective oxidation stage 13, in which impurities in the hydrogen-rich gas are oxidized with carbon monoxide, with the addition of air or an oxygen-containing medium $O_2$, to form carbon dioxide. Following the selective oxidation stage 13, a hydrogen-rich gas $H_2$ which, however, will still contain residues of the hydrocarbon-containing compound and carbon dioxide then flows into the region of the anode 3 of the fuel cell 2. In the gas generation system 1' or the fuel cell system shown in FIG. 2, the exhaust gases then flow out of the region of the fuel cell 2 into the catalytic burner 10, so that the residual energy which they contain, in a similar manner to that which has already been described above, can be fed to the heat exchanger/evaporator 7.

In the text which follows, the starting method is to be explained by way of example on the basis of the two gas generation systems 1 and 1' which have been outlined above. Of course, these can also be transferred to other similar gas generation systems, which means that the invention is not intended to be restricted either to the two embodiments of the gas generation system which have been described or to the use of water, air and gasoline or diesel as starting substances.

Before the actual generation of the hydrogen-containing gas in the gas generation system 1 begins, in particular the reformer 6 has to be heated to its ignition temperature. If steam is being added for reforming, this steam also has to be generated, which is done by the heat exchanger/evaporator 7 as device for conditioning at least some of the starting substances. To satisfy these two preconditions which are required at the start of the gas generation system 1 and in particular at the start of the reforming, the starting burner 11, through preferably super-stoichiometric combustion of a fuel, in particular the hydrocarbon-containing compound $C_nH_m$, which is already used in any case in the gas generation system 1 to generate the hydrogen-containing gas, generates a hot exhaust gas. According to the exemplary embodiment illustrated here, the starting burner 11 is designed as a porous burner, since this provides the hot exhaust gas at temperatures of up to 1000° C. during the superstoichiometric combustion of the hydrocarbon-containing compound $C_nH_m$ under ideal conditions. This hot exhaust gas is then used to heat the heat exchanger/evaporator 7, in which the conditioning of the starting substances, and in particular the evaporation and superheating of the water $H_2O$ and if appropriate also preheating of the air $O_2$ required for the autothermal reforming are carried out.

Figure 3:
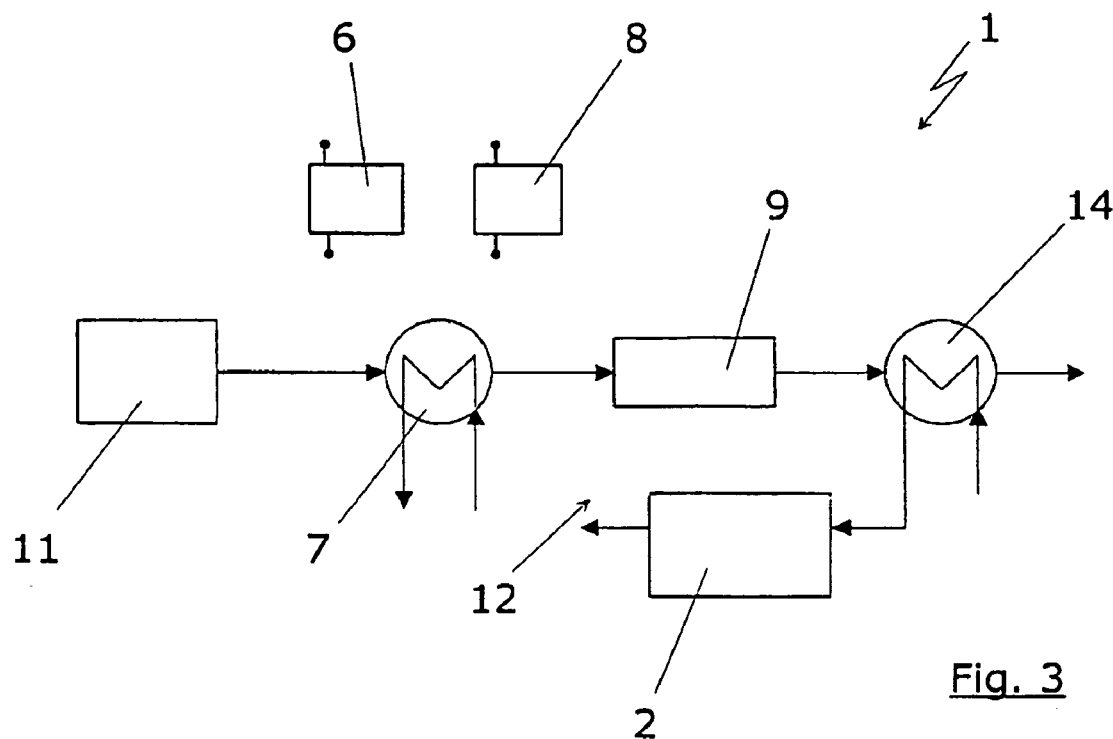
FIG. 3 diagrammatically depicts operation of the first possible embodiment in the event of a cold start.

The hot exhaust gas from the starting burner 11 is cooled in the heat exchanger/evaporator 7 to such an extent that it can then be used to heat the further components 12. In accordance with the diagrammatic illustration in FIG. 3, the further components 12 are in this case in particular the hydrogen separation module 9 and a heat exchanger 14. In the initial phase of the cold start process, the hot gas, downstream of the heat exchanger/evaporator 7, will have been cooled to such an extent that it only allows preheating of the hydrogen separation module 9 and minimal heating of the heat exchanger 14. As the starting process continues, however, ever more thermal energy from other sources, in particular from the catalytic burner 10, will pass into the region of the heat exchanger/evaporator 7, and consequently a higher residual heat content provides for increasing heating of the hydrogen separation module 9 and the heat exchanger 14. In particular, these further components 12 do not require particularly high temperatures of the heating exhaust gas, since standard hydrogen separation modules can in principle function for example at temperatures of from approx. 80 to 100° C., albeit with a poor efficiency. The heat exchanger 14 heats a coolant which flows in particular in a cooling circuit of the fuel cell 2 and which accordingly heats the fuel cell 2. Since, when the abovementioned PEM fuel cell is in use, operating temperatures of the order of magnitude of 60 to 100° C. are customary, in this case too the residual heat contained in the exhaust gas is sufficient to sufficiently preheat or heat the coolant for the fuel cell 2.

In parallel with this, the reformer 6 and the at least one shift stage 8 in the schematic structure illustrated here are heated electrically, as is symbolically illustrated by the electrical terminals indicated in the region of said components 6, 8. In addition to the electrical heating, the heating of the shift stage 8, as soon as reformate flows out of the reformer 6 into the region of the at least one shift stage 8, can be effected by combustion together with the optional supply of an oxygen-containing medium $O_2$, e.g. air, as indicated in FIG. 1. The combustion of at least some of the contents of the reformate in the at least one shift stage 8 with the oxygen $O_2$ can effect direct heating of the at least one shift stage 8.

Figure 5:
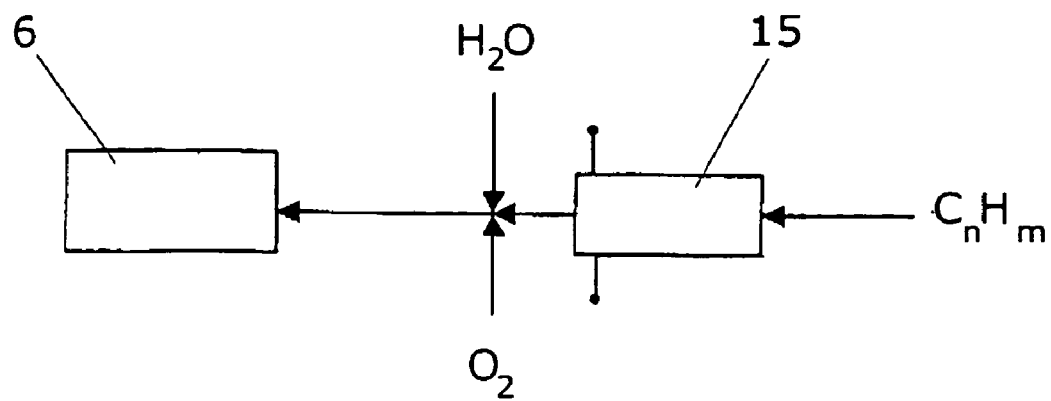
FIG. 5 diagrammatically depicts preparation of a fuel.

After the reformer 6 has been heated to its ignition temperature and, if necessary, the supply of steam has been ensured, in a second step of the method for starting the gas generation system 1, the reforming process begins. At the start of this reforming process in the reformer 6, fuel is added in the form of the hydrocarbon-containing compound $C_nH_m$, air $O_2$ and/or steam $H_2O$. The hydrocarbon-containing compound is in this case particularly expediently, as illustrated in FIG. 5, evaporated by means of an electrical evaporator 15, which, on account of the small quantity of fuel which is typically used and the relatively low energy which is usually required for evaporation, can be achieved with little outlay on electrical energy.

As soon as the superheated steam and/or the preheated air is then available in a sufficient quantity and at a sufficient temperature level, simple injection of the fuel into this hot gas stream is sufficient to ensure adequate evaporation. The electrical evaporator 15 then no longer needs to be operated. The start of the reforming takes place in the reformer 6 with operating parameters which are modified compared to normal operation and are then adjusted toward the operating parameters in normal operation of the gas generation system 1 with increasing heating of the gas generation system 1. As has already been mentioned above, during the cold start process of the at least one shift stage 8, moreover, oxygen or air is added, so that in this case too the heating is accelerated. This takes place in parallel with the heating using the reformate, and the electrical heating described above is additionally provided.

Figure 4:
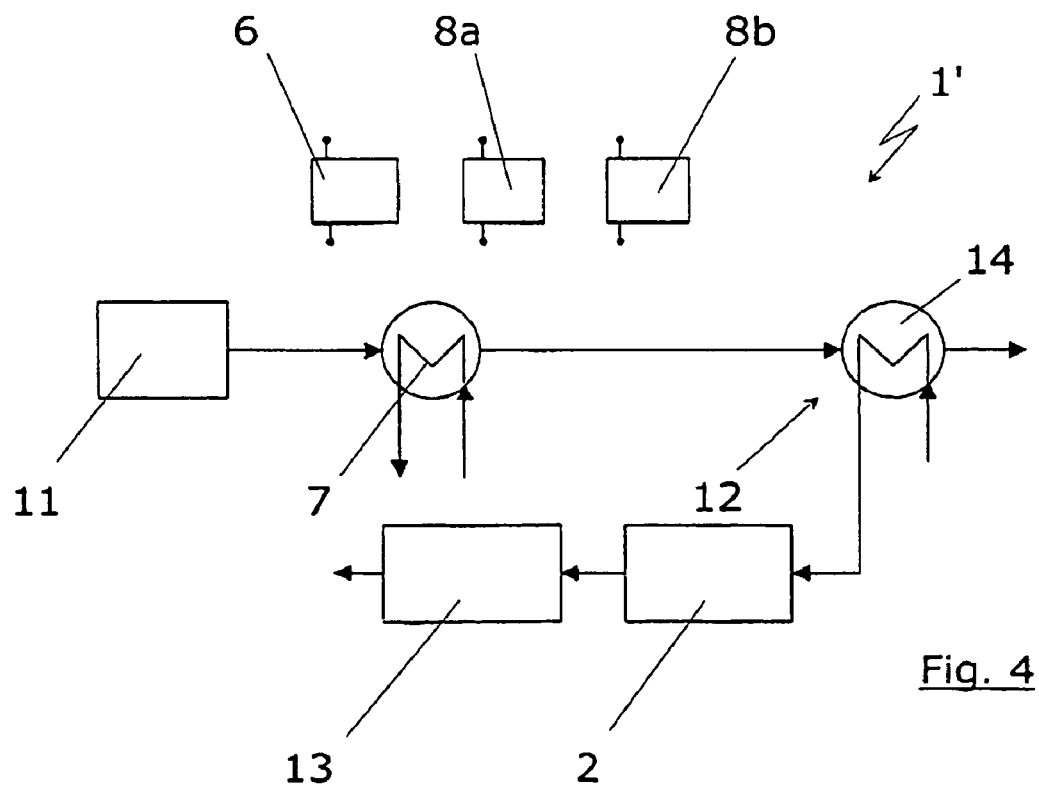
FIG. 4 diagrammatically depicts operation of the further possible embodiment in the event of a cold start.

Similar statements also apply to the starting method in the gas generation system 1', which is explained in more detail in the form of a diagrammatic illustration in FIG. 4. The illustration is to this extent analogous to the illustration in FIG. 3. Only the heating of the membrane module 9 is eliminated here, since this module is not present in the gas generation system 1'. Since the selective oxidation stage 13 requires a much lower temperature level than the shift stage 8 or the shift stages 8a, 8b, it is not heated directly by the hot exhaust gases, but rather is likewise heated by means of the cooling circuit of the fuel cell 2, with the heat being introduced into the cooling circuit via the heat exchanger 14 in the manner which is already known from the above text.

Figure 6:
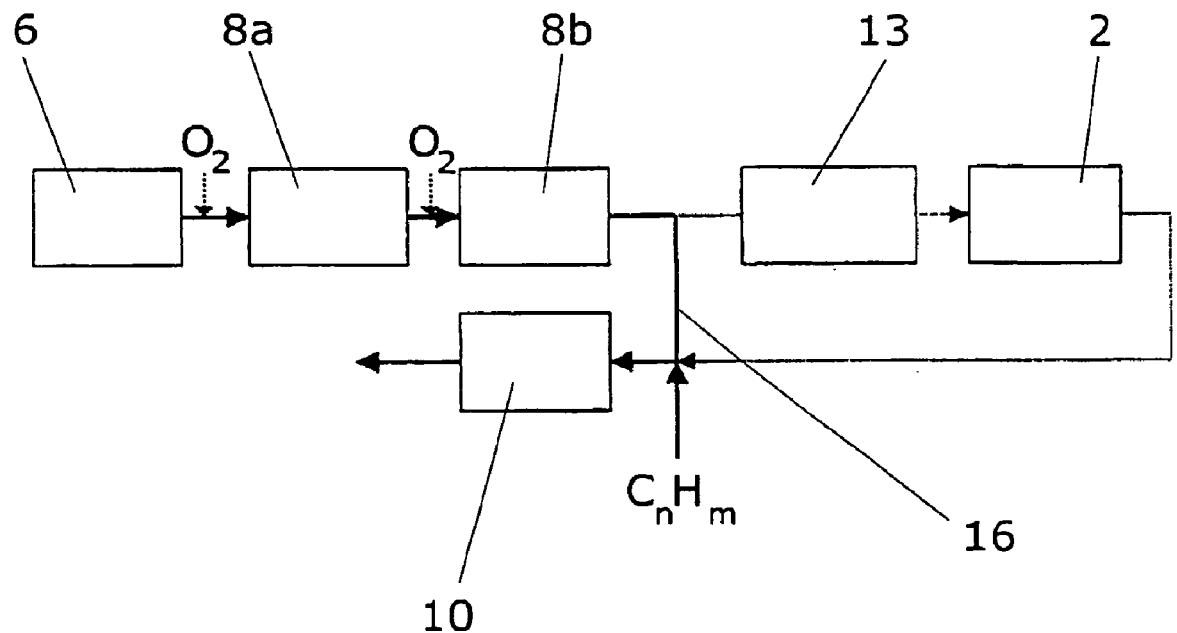
FIG. 6 diagrammatically depicts a possible connection arrangement for the gas generation system in the event of a cold start.

In the second starting phase, in the case of the design of the gas generation system 1' shown in FIG. 2, the reformate which is generated cannot be fed directly to the fuel cell 2, since it contains a very high level of carbon monoxide CO, which would lead to poisoning of the electrocatalysts in the fuel cell 2. The oxidation stage 13, which at this time has generally not yet been sufficiently preheated, would be unable to completely convert such a high level of carbon monoxide. For this reason, a gas generation system 1' designed as shown in FIG. 2, during the starting phase, is operated in such a way that a bypass 16 passes the hydrogen-containing gas which is generated directly downstream of the high-temperature shift stage 8b into the region of the catalytic burner 10, as is indicated in FIG. 6. The selective oxidation stage 13 and the fuel cell 2 are therefore bypassed by this bypass 16, which means that they are only included in operation when the components of the gas generation system 1' are at a sufficient temperature and the reformate is of a sufficient quality. In addition, as is indicated in FIG. 6, fuel, such as for example the hydrocarbon-containing compound $C_nH_m$ which is already used in the gas generation system 1', can be added in the region of the catalytic burner 10, so that the heat yield of the catalytic burner 10 can be increased on demand.

In addition, the gas generation system 1 with the membrane module 9 is brought to its operating pressure and, if necessary, an additional compression device for supplying air to the reformer 6 is started, so that in the membrane module 9 which has already been preheated hydrogen can be separated out of the reformate and fed to the fuel cell 2. This early start of the fuel cell 2 with virtually pure hydrogen without there being any risk of corresponding impurities made up of CO or the like, as would be the case in the design of the gas generation system 1', allows very rapid heating of the fuel cell 2 by starting it up.

In accordance with the system structure illustrated in FIG. 1, the residual gas from the membrane module 9, the retentate R, is fed to the catalytic burner 10, so that this too provides thermal energy at a very early stage during the starting operation, which thermal energy likewise serves to heat the heat exchanger/evaporator 7 and further shortens the starting time for the gas generation system 1 or 1'. In this phase too, the heating of the further components, in particular the membrane module 9 and the heat exchanger 14, will continue. As soon as the majority of the thermal energy required for the conditioning of the starting substances is being delivered by the catalytic burner 10, it is also possible to reduce the power or the supply of fuel to the starting burner 11, so that there is no overheating of the coolant in the region of the heat exchanger 14.

During the starting method itself, the system pressure in the gas generation system 1 or 1' is increased continuously. Consequently, the starting burner 11 is very easy to integrate in the gas generation system 1 or 1'. The starting burner 11 can be linked in, for example, via line elements which only have heat-resistant return flow prevention means, so that the connection to the starting burner 11 is automatically eliminated with increased system pressure in the gas generation system 1 or 1'. This measure makes it possible, for example, to dispense with the need for expensive high-temperature-resistant valves, proportional control valves or the like. This is also possible in particular because the starting burner 11 with a high temperature level supplies substantially only one component, namely the heat exchanger and/or evaporator, and the downstream components can be arranged in the standard flow path of the system.

In the starting method described here, which has been explained in principle on the basis of the example of the two gas generation systems 1 and 1' explained in the introduction, in each case very rapid heating of the overall system is achieved, which on account of the measures explained above is possible within a very short period of time and with very low emissions.

What is claimed is:

1. A method for starting a gas generation system for generating a hydrogen-containing gas for operating a fuel cell, wherein the system includes at least one converting device configured to convert starting substances into the hydrogen-containing gas, at least one conditioning device configured to condition at least some of the starting substances, at least one removal device configured to remove undesirable gas constituents from the hydrogen-containing gas, and a starting burner, the method comprising:

in a first step, burning at least one fuel in the starting burner so as to form hot exhaust gases, heating the conditioning device using the hot exhaust gases, using a residual heat from the hot exhaust gases to heat at least one further component, and electrically heating the at least one converting device;

in a second step, adding starting substances at an initial quantitative ratio with respect to one another to respective components of the devices after a starting temperature has been reached; and in a third step, continuously changing the quantitative ratio from the initial quantitative ratio toward an operational quantitative ratio;

wherein the at least one further component includes a hydrogen separation module including at least one membrane selectively permeable to hydrogen and a heat exchanger of a cooling circuit.

2. The method as recited in claim 1, wherein the residual heat is used to heat the hydrogen separation module first and then the cooling circuit.

3. The method as recited in claim 1, wherein the cooling circuit heats the fuel cell.

4. The method as recited in claim 1, wherein the cooling circuit heats a selective oxidation stage.

5. A method for starting a gas generation system for generating a hydrogen-containing gas for operating a fuel cell, wherein the system includes at least one converting device configured to convert starting substances into the hydrogen-containing gas, at least one conditioning device configured to condition at least some of the starting substances, at least one removal device configured to remove undesirable gas constituents from the hydrogen-containing gas, and a starting burner, the method comprising:

> in a first step, burning at least one fuel in the starting burner so as to form hot exhaust gases, heating the conditioning device using the hot exhaust gases, using a residual heat from the hot exhaust gases to heat at least one further component, and electrically heating the at least one converting device;
>
> in a second step, during an initial stage of the second step, passing at least some of a gas generated in the at least one converting device through a bypass around at least one of the fuel cell and the at least one removal device, and feeding the gas directly to a catalytic burner, and adding starting substances at an initial quantitative ratio with respect to one another to respective components of the devices after a starting temperature has been reached; and
>
> in a third step, continuously changing the quantitative ratio from the initial quantitative ratio toward an operational quantitative ratio.

6. The method as recited in claim 5, further comprising delivering energy for operating the conditioning device from the catalytic burner.

* * * * *